S. C. Stokes,
Knife Sharpener.
N° 27,413.  Patented Mar. 6, 1860.
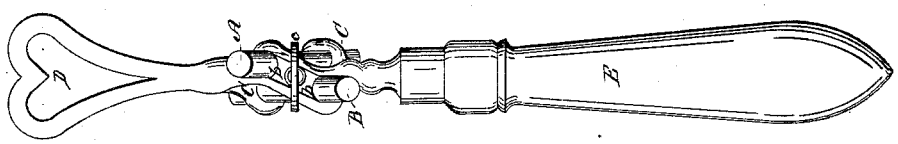
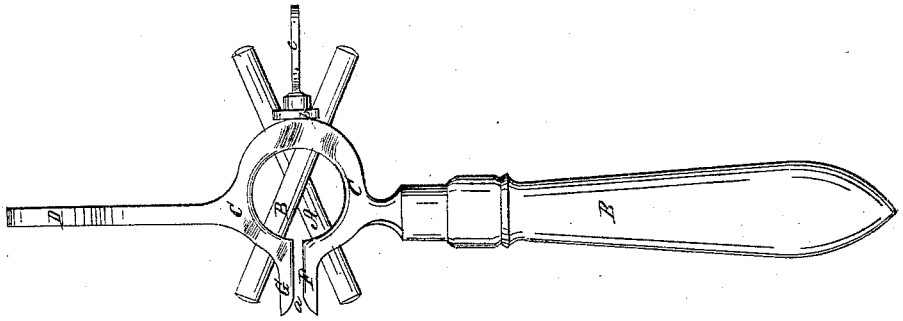
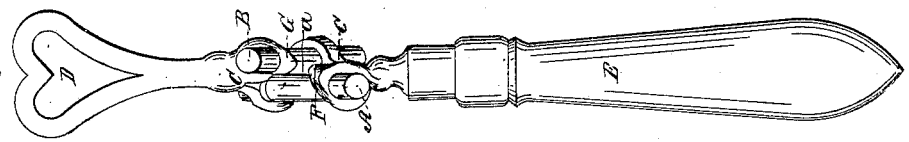
Witnesses:  Inventor;
R. N. Batchelder  Septimus C Stokes

UNITED STATES PATENT OFFICE.

SEPTIMUS C. STOKES, OF MANCHESTER, NEW HAMPSHIRE, ASSIGNOR TO HIMSELF AND BENJAMIN S. STOKES, OF SAME PLACE.

KNIFE-SHARPENER.

Specification of Letters Patent No. 27,413, dated March 6, 1860.

*To all whom it may concern:*

Be it known that I, SEPTIMUS C. STOKES, of Manchester, in the county of Hillsboro and State of New Hampshire, have invented an Improved Knife-Sharpener; and I do hereby declare the same to be fully described and represented in the following specification and the accompanying drawing, of which—

Figure 1, denotes a top view; Fig. 2, a bottom view, and Fig. 3, a side elevation of it.

In carrying out or constructing my invention, I make use of two steel bars or rods, A, B, which I prefer to have of a cylindrical form and with their external surfaces made rough or capable of abrading or wearing away a knife edge or piece of metal when rubbed against them. For this purpose, these surfaces may be scored longitudinally with numerous fine or very narrow grooves. These two bars A, B, I arrange so that one shall cross the other and the external surfaces of both be in contact or nearly so and be tangential to one another and I fix such bars within a suitable frame or holder C, provided with a handle, E, to extend from it as shown in the drawings. The said frame may have a rest, D, extended from it as shown in the drawings, the same being in order to obtain a firmer or better support for the knife sharpener than he could conveniently by means of the handle alone.

Between the two bars A, B, I arrange as shown in the drawings, two guides, F, G, for properly guiding and supporting a knife while it is being sharpened. They should be arranged apart from each other as shown at *a*, in the drawings, each being made angular on its inner surface, as exhibited in Figs. 1, and 3.

The two bars A, B, should be movable in their holder, that is so to be capable of being moved or slid longitudinally therein or of being turned around axially or transversely, the same being in order that after either or both of the bars may have become worn in any part or parts, such bar or bars may be adjusted or moved within its frame or holder so as to bring one or more fresh surfaces into the proper position or positions for acting on a knife while it is being sharpened. When the bars are so applied to the frame, I combine with them a device or devices of some proper kind by which the movable bar or bars may be clamped in position. Such may be composed of a plate *b*, and a thumb screw, *c*, arranged as shown in the drawings. The plate extends between the two bars, straddles each and has the screw extended through it and screwed into the holder C, the screw being so formed that while being screwed into the holder such screw shall crowd the clamp plate, *b*, toward the vertex of the angle of crossing of the bars, and so against the bars as to hold them, or in case one only is movable, it, fast in the holder, C.

By means of my improved knife sharpener so made, the cutting edge of a knife may be reduced with an angle more or less acute in proportion as the knife while between the guides, F, G, may be held out of right angles with and toward the axis of the handle, E. This property of my knife sharpener renders it very useful and far preferable to many others.

I am aware that two steel wheels or circular plates have been lapped on each other arranged with their axes parallel, and used as a knife sharpener, a knife while being sharpened being not only held in the angle made by, but drawn against their circumferences, the direction of movement of the knife being parallel to the axis of the wheels. By the said wheels, the angle of reduction of the knife is always the same or thereabout.

I do not claim such a combination and arrangement of wheels, but

I claim—

1. The combination and arrangement of two cylindrical or other files or bars, A, B, with a frame or holder, C, and a clamp substantially as and for the purpose hereinbefore described.

2. And in combination with two rods or bars A and B, and a frame or holder C, arranged with respect to each other substantially as specified I claim the gages or guides F, G, arranged relatively to the said bars, essentially in manner and for the purpose as set forth.

3. I also claim the combination and arrangement of the projecting rest D, with the two crossed bars, A, B, and their holder, C, provided with a handle as specified.

SEPTIMUS C. STOKES.

Witnesses:
R. H. BATCHELDER,
B. P. CILLEY.